United States Patent
McFadden et al.

(10) Patent No.: US 11,351,929 B2
(45) Date of Patent: Jun. 7, 2022

(54) HITCH-MOUNTED BICYCLE RACK SYSTEM

(71) Applicant: Yakima Products, Inc., Lake Oswego, OR (US)

(72) Inventors: Scott A. McFadden, Portland, OR (US); Gian-Marco D'Angelo, Portland, OR (US); Jason Attfield Sagen, Portland, OR (US); Warren E. Stoneburner, Scottsdale, AZ (US); Brandon Michael Willems, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

(21) Appl. No.: 17/107,919

(22) Filed: Nov. 30, 2020

(65) Prior Publication Data

US 2021/0253034 A1  Aug. 19, 2021

Related U.S. Application Data

(63) Continuation of application No. 16/206,794, filed on Nov. 30, 2018, now Pat. No. 10,850,678.

(60) Provisional application No. 62/593,179, filed on Nov. 30, 2017.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................... B60R 9/06; B60R 9/10

USPC ........................................................ 224/924
See application file for complete search history.

(56) References Cited

U.S. PATENT DOCUMENTS

| | | | |
|---|---|---|---|
| 3,921,869 A | 11/1975 | Rogers | |
| 4,171,077 A | 10/1979 | Richard, Jr. | |
| 5,067,641 A | 11/1991 | Johnson et al. | |
| 5,211,323 A | 5/1993 | Chimenti et al. | |

(Continued)

FOREIGN PATENT DOCUMENTS

| | | |
|---|---|---|
| CA | 2468447 A1 | 8/2005 |
| CA | 2468447 C | 11/2006 |

(Continued)

OTHER PUBLICATIONS

U.S. Patent and Trademark Office, Non-Final Office Action regarding U.S. Appl. No. 16/206,794, dated Dec. 12, 2019, 12 pages.

(Continued)

*Primary Examiner* — Scott T McNurlen
(74) *Attorney, Agent, or Firm* — Kolisch Hartwell, P.C.

(57) ABSTRACT

A bicycle rack is disclosed, including a hitch mount device and a mast structure. A proximal portion of the mast structure is connected to the hitch mount device, and a distal portion extends upward from the proximal portion. The bicycle rack further includes an upper beam structure connected horizontally to the distal portion of the mast structure and a first fork crown gripping station mounted on the upper beam structure. The first fork crown gripping station includes a first post structure and a strap configured to cooperatively bind a bicycle front fork crown to the first fork crown gripping station.

20 Claims, 8 Drawing Sheets

(56) References Cited

U.S. PATENT DOCUMENTS

| | | |
|---|---|---|
| 5,526,971 A | 6/1996 | Despain |
| 5,558,261 A | 9/1996 | Hedeen |
| 5,647,521 A | 7/1997 | Burgess |
| 5,803,330 A | 9/1998 | Stack et al. |
| 5,871,131 A | 2/1999 | Low et al. |
| 5,996,870 A | 12/1999 | Shaver |
| 6,010,049 A | 1/2000 | Stein |
| 6,123,498 A | 9/2000 | Surkin |
| 6,435,523 B1 | 8/2002 | Hilk |
| 6,491,195 B1 | 12/2002 | McLemore et al. |
| 6,516,986 B1 | 2/2003 | Lassanske |
| 6,834,786 B2 | 12/2004 | Hansen |
| 7,900,802 B2 | 3/2011 | Hammond |
| 7,959,047 B2 | 6/2011 | Hammond |
| D663,676 S | 7/2012 | Loken et al. |
| 8,434,655 B2 | 5/2013 | Hammond |
| 9,321,406 B2 | 4/2016 | Loken |
| 9,321,407 B2 | 4/2016 | Loken |
| 9,862,439 B2 | 1/2018 | Hammond |
| 10,183,627 B1* | 1/2019 | Liu .......................... B60R 9/10 |
| 10,906,473 B1* | 2/2021 | Yu ............................ B60R 9/06 |
| 11,046,379 B2* | 6/2021 | Tsai ......................... B60R 9/10 |
| 11,148,607 B1* | 10/2021 | Hsieh ...................... B60R 9/10 |
| 2001/0035446 A1 | 11/2001 | Walstrom et al. |
| 2006/0237505 A1 | 10/2006 | Hammond |
| 2007/0119889 A1 | 5/2007 | Hammond |
| 2011/0101060 A1 | 5/2011 | Hammond |
| 2013/0327802 A1 | 12/2013 | Hammond |
| 2014/0027484 A1 | 1/2014 | Loken |
| 2014/0151421 A1 | 6/2014 | Loken |
| 2017/0253188 A1* | 9/2017 | Shen ........................ B60R 9/10 |
| 2018/0072237 A1* | 3/2018 | Kuschmeader .......... B60R 9/10 |
| 2018/0251076 A1 | 9/2018 | Casagrande |

FOREIGN PATENT DOCUMENTS

| | | |
|---|---|---|
| DE | 3890700 C2 | 12/1996 |
| EP | 95548 A2 | 12/1983 |
| EP | 0721860 A1 | 7/1996 |
| GB | 2327655 A | 2/1999 |
| JP | 2015058737 A | 3/2015 |
| WO | 8901883 A1 | 3/1989 |
| WO | 03064214 A1 | 8/2003 |
| WO | 2018148887 A1 | 8/2018 |

OTHER PUBLICATIONS

U.S. Patent and Trademark Office, Non-Final Office Action regarding U.S. Appl. No. 16/206,794, dated Apr. 8, 2020, 8 pages.

* cited by examiner

HITCH-MOUNTED BICYCLE RACK SYSTEM

CROSS-REFERENCES TO RELATED APPLICATIONS

This application is a continuation of U.S. patent application Ser. No. 16/206,794 filed Nov. 30, 2018, which claims priority from U.S. Provisional Patent Application Ser. No. 62/593,179, filed Nov. 30, 2017. The complete disclosures of each application are hereby incorporated by reference in their entireties for all purposes.

INTRODUCTION

Popularity of outdoor recreational activities has created increased demand for different ways to carry a variety of recreational equipment on vehicles. Bicyclists often want to transport multiple bicycles to a recreational area on a single vehicle. Some bicycles, for example mountain bikes, have wide ranges of dimensional and weight variations which may impose significant limitations on the carrying capacities of existing hitch racks. Hitch racks that carry bicycles with one wheel above the other, which may be referred to as a vertical orientation, offer a possible compact arrangement. However, each bicycle must be secured to prevent unwanted motion or contact with adjacent bicycles. A rack that can stably and securely carry multiple bicycles in a vertical position is therefore desirable.

DETAILED DESCRIPTION

Figure 1:
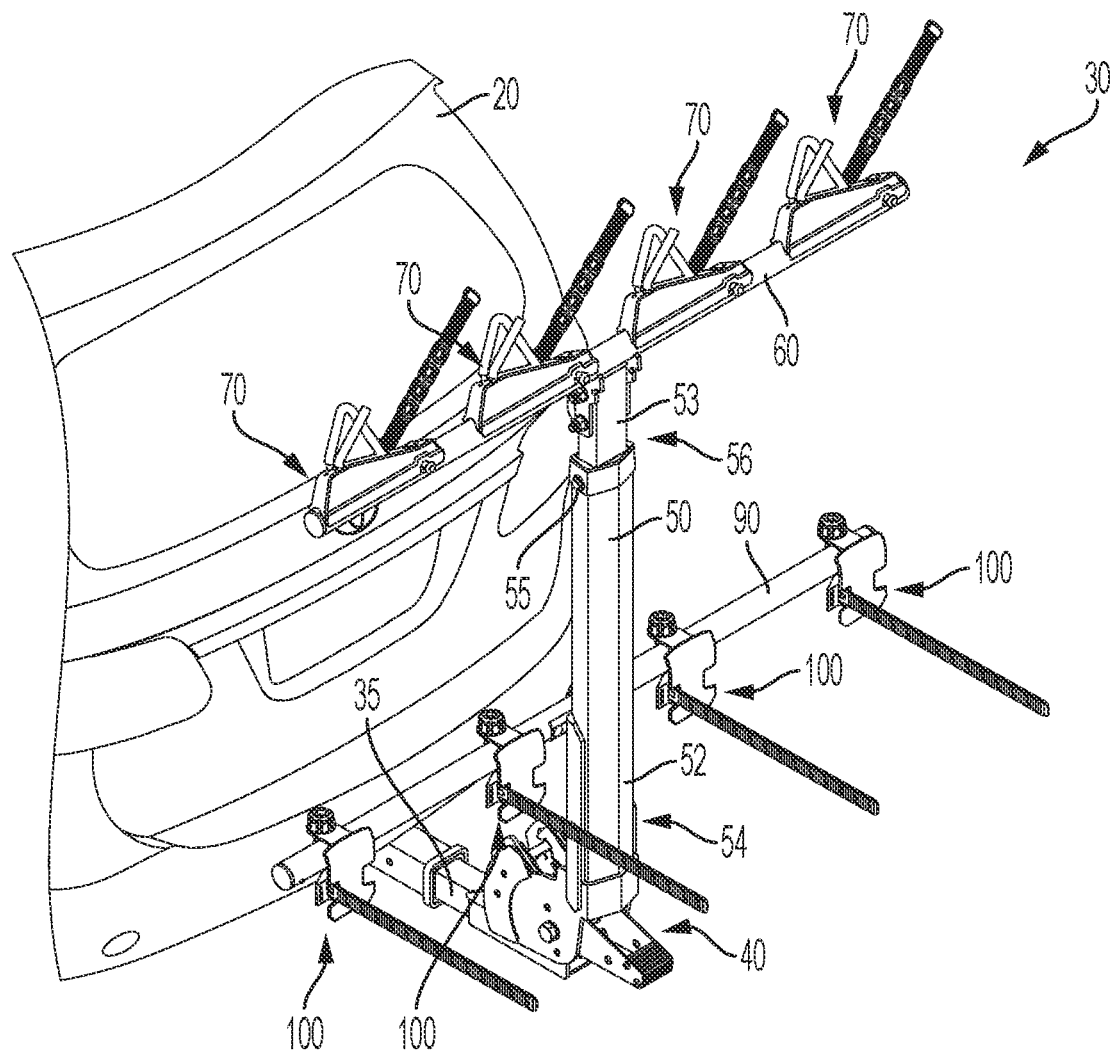
FIG. 1 is an isometric view of an illustrative vertical bicycle rack in accordance with aspects of the present disclosure.

This disclosure provides selected examples of bicycle racks. Many alternatives and modifications which may or may not be expressly mentioned, are enabled, implied, currently possessed, and are supported by the disclosure. Unless otherwise specified, a bicycle rack in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion.

Overview

In general, a hitch-mounted bicycle rack system in accordance with the present teachings may include a connector appropriate to mount the rack to a vehicle. For example, the rack may include a bar configured to engage the hitch receiver of a vehicle hitch. The rack may include a primary elongate member, which may be securable at one or more angles. For example, the rack may include a mast pivotably attached to a hitch bar.

An upper and a lower elongate member may be attached to the primary elongate member. One or more support assemblies may be mounted on the upper elongate member, and one or more securing assemblies may be mounted on the lower elongate member. The support assemblies may be configured to support a bicycle by engaging a fork crown of the bicycle. The securing assemblies may be configured to stabilize and/or secure a bicycle by engaging a rear wheel of the bicycle.

Each support assembly may include a crown brace and a crown rest. The fork crown of a bicycle may be supported between two portions of the crown brace, and on an upper surface of the crown rest. The fork crown may be supported at an angle relative to the frame of the bicycle and may be secured to the crown rest by a strap.

Examples, Components, and Alternatives

The following sections describe selected aspects of exemplary bicycle racks as well as related systems and/or methods. The examples in these sections are intended for illustration and should not be interpreted as limiting the entire scope of the present disclosure. Each section may include one or more distinct examples, and/or contextual or related information, function, and/or structure.

As shown in FIGS. 1-9, this section describes an illustrative vertical bicycle rack 30, suitable for carrying one or more bicycles with a vehicle. Rack 30 is an example of the hitch-mounted bicycle rack system described above.

FIG. 1 is a perspective view of rack 30, mounted on a vehicle 20. Rack 30 includes a hitch bar 35 configured to be mounted to a hitch receiver, such as the hitch receiver disposed on the rear of vehicle 20. A mast tilting assembly 40 disposed near a second end portion of hitch bar 35 connects the hitch bar to a proximal portion 54 of a mast 50.

Mast 50 includes an outer mast segment 52 and an inner mast segment 53, disposed in a telescoping configuration. In some examples, one or more additional inner mast segments may be included to allow a greater telescopic range. Mast 50 includes a locking mechanism 55 to selectively prevent telescoping. Locking mechanism 55 may be configured to prevent one or more of the inner mast segments from sliding into outer mast segment 52, and/or multiple locking mechanisms may be included.

In the depicted example, locking mechanism 55 incudes a bolt extending through corresponding apertures in outer mast segment 52 and inner mast segment 53. Inner mast segment 53 includes two apertures, such that mast 50 can be secured either in a telescoped or a collapsed position. Any number of apertures may be included in inner mast segment 53 and/or outer mast segment 52 to allow mast 50 to be secured at any desirable degree of extension. In some examples, locking mechanism 55 may include a cam lever configured to interface with one or more detents in inner mast segment 53.

An upper beam, or top beam 60 is connected to mast 50. The top beam is attached proximate a distal portion 56 of mast 50. Top beam 60 is substantially orthogonal to mast 50 and to hitch bar 35, and may be described as orthogonal to a longitudinal extent and/or direction of travel of vehicle 20. The top beam is bisected by mast 50. In some examples, the length of top beam 60 may be approximately equal to the width of vehicle 20, and/or a typical vehicle (e.g., a car, pickup truck, or SUV). In some examples, the length of top beam 60 may be adjustable. The top beam may be thereby adjusted to match the width of a specific vehicle and/or accommodate a desired number of bicycles.

A plurality of fork crown gripping stations 70 are mounted on top beam 60, each gripping station configured to engage the front fork of bicycle. Each gripping station is configured to support the weight of a bicycle, and to secure the front fork, front wheel, and handlebars of the bicycle. In the depicted example, four gripping stations 70 are mounted on top beam 60. Rack 30 is thereby configured to carry up to four bicycles. Any desired number of gripping stations may be mounted to the top beam, and/or top beam 60 may be configured for removal and attachment of gripping stations as desired by a user.

A lower beam, or bottom beam 90 is connected to mast 50. The bottom beam is attached to the mast proximally of top beam 60 and may be proximate proximal portion 54 of the mast. Bottom beam 90 is oriented substantially parallel to top beam 60 and is substantially the same length as top beam 60. Bottom beam 90 may be selectively slidable along mast 50 such that bottom beam 90 can be moved closer to or farther from top beam 60.

A plurality of rear wheel binding devices 100 are mounted on bottom beam 90, each binding device configured to secure a rear wheel of a bicycle suspended from a corresponding gripping station 70. In the present example, four binding devices 100 are mounted on bottom beam 90. Each binding device is positioned in alignment with a corresponding one of gripping stations 70. In present example, rack 30 includes an equal number of gripping stations 70 and wheel binding devices 100. In some examples, the rack may include fewer binding devices than gripping stations and/or may omit bottom beam 90 and the binding devices.

In some examples, gripping stations 70 and/or binding devices 100 may be disposed on top beam 60 and bottom beam 90 such that the number of bicycles on each side of mast 50 is equal or nearly equal. In some examples, the gripping stations and binding devices may be disposed such that the respective combined weight of bicycles on each side of mast 50 is equal. In some examples, the position of gripping stations 70 and/or binding devices 100 may be adjustable to allow a user to balance the weight of supported bicycles. Top beam 60 and bottom beam 90 may have any matching and/or differing lengths and/or angles. The beams may be centered and/or asymmetrical relative to mast 50.

Adjacent gripping stations 70 and/or rear wheel cradle assemblies 100 may be uniformly spaced, and/or may be spaced to accommodate a desired set or arrangement of bicycles. For example, gripping stations 70 and binding devices 100 may be disposed at unequal intervening distances so that a valuable or fragile bicycle may be hung far away from a group of more durable bicycles.

Figure 2A:
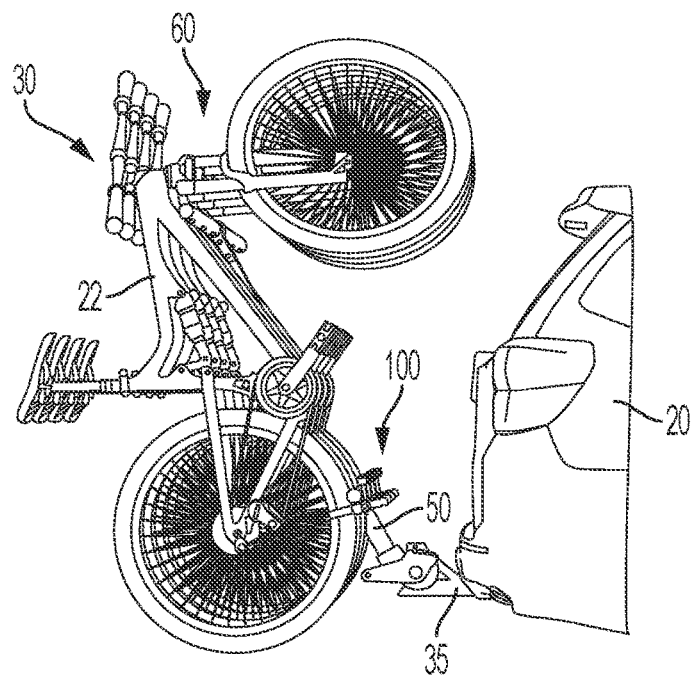
FIG. 2A is a side view of the bicycle rack of FIG. 1, in a transport position.
Figure 2B:
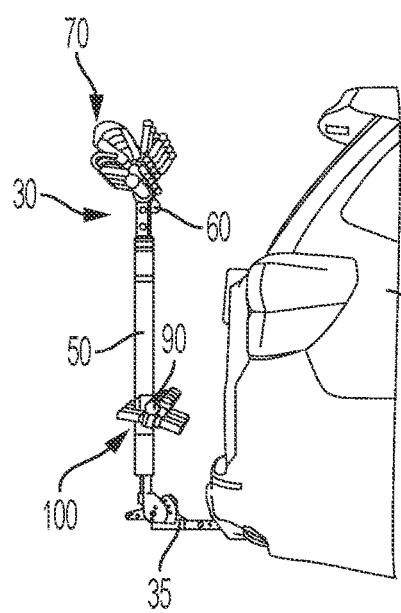
FIG. 2B is a side view of the bicycle rack of FIG. 1, in a stowed position.
Figure 2C:
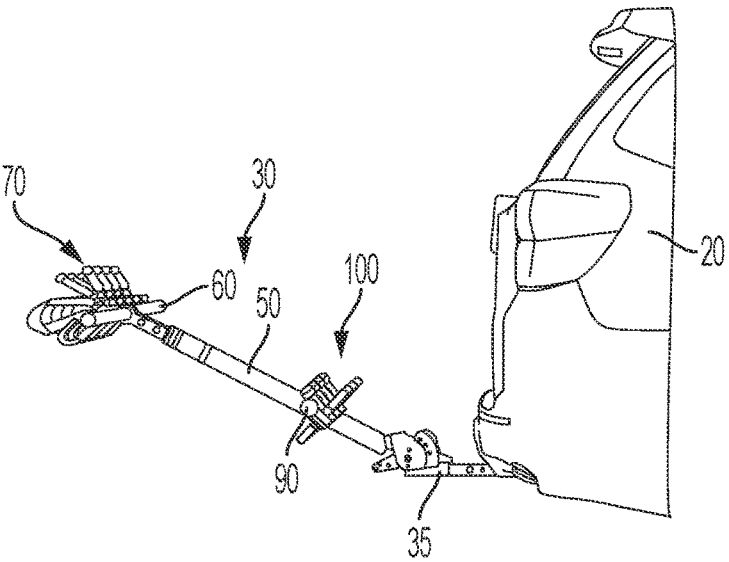
FIG. 2C is a side view of the bicycle rack of FIG. 1, in a trunk access position.

FIGS. 2A, 2B, and 2C show rack 30 in a bicycle transport position, stowed position, and trunk-access position, respectively. These three positions correspond to different angular positions of mast 50 with respect to hitch bar 35. They may each also be associated with either an extended or collapsed configuration of a telescoping mast 50. Mast tilting assembly 40 is operable to pivot mast 50, and thereby transition rack 30 from one position to another. Mast tilting assembly 40 is configured such that mast 50 is pivotable about an axis orthogonal to both mast 50 and hitch bar 35.

FIG. 2A depicts rack system 30 in a bicycle-transport position. In the bicycle-transport position, mast 50 is disposed at an angle relative to hitch bar 35 such that a bicycle suspended from a gripping station 70 can be transported safely by the vehicle. For example, the angle may be selected such that the rear wheel of the bicycle is at least a desired height from the ground and/or at least a desired distance from mast tilting assembly 40, and/or such that all parts of the bicycle are at least a desired distance from vehicle 20. Mast 50 may be in a telescoped configuration when rack 30 is in the bicycle-transport position.

In some examples, rack system 30 may include multiple bicycle-transport positions. Such positions may allow a user to locate supported bicycles as desired based on a specific vehicle and/or bicycle. For example, a user may secure the rack with mast 50 at a greater angle on a hatch-back vehicle than on a vehicle having a trunk, to provide adequate clearance for the front wheels of supported bicycles. In some examples, and/or for some vehicles, mast 50 may be perpendicular to hitch bar 35 in a bicycle-transport position.

FIG. 2B depicts rack 30 in a stowed position. This position minimizes the space occupied by rack 30 when it is not in use for transporting bicycles. In the stowed position, mast 50 is positioned close to the vehicle. In the depicted example, mast 50 is positioned substantially orthogonally to hitch bar 35. Mast 50 may be in a collapsed configuration when rack 30 is in the stowed position.

FIG. 2C depicts rack 30 in a trunk-access position. In the trunk-access position, mast 50 is disposed at an angle relative to hitch bar 35 such that mast 50 is sufficiently far from a trunk or hatch of vehicle 20 that a user's access to the trunk or hatch is not impeded. Mast 50 may be in either the collapsed or extended configuration when rack system 30 is in the trunk-access position.

Figure 3:
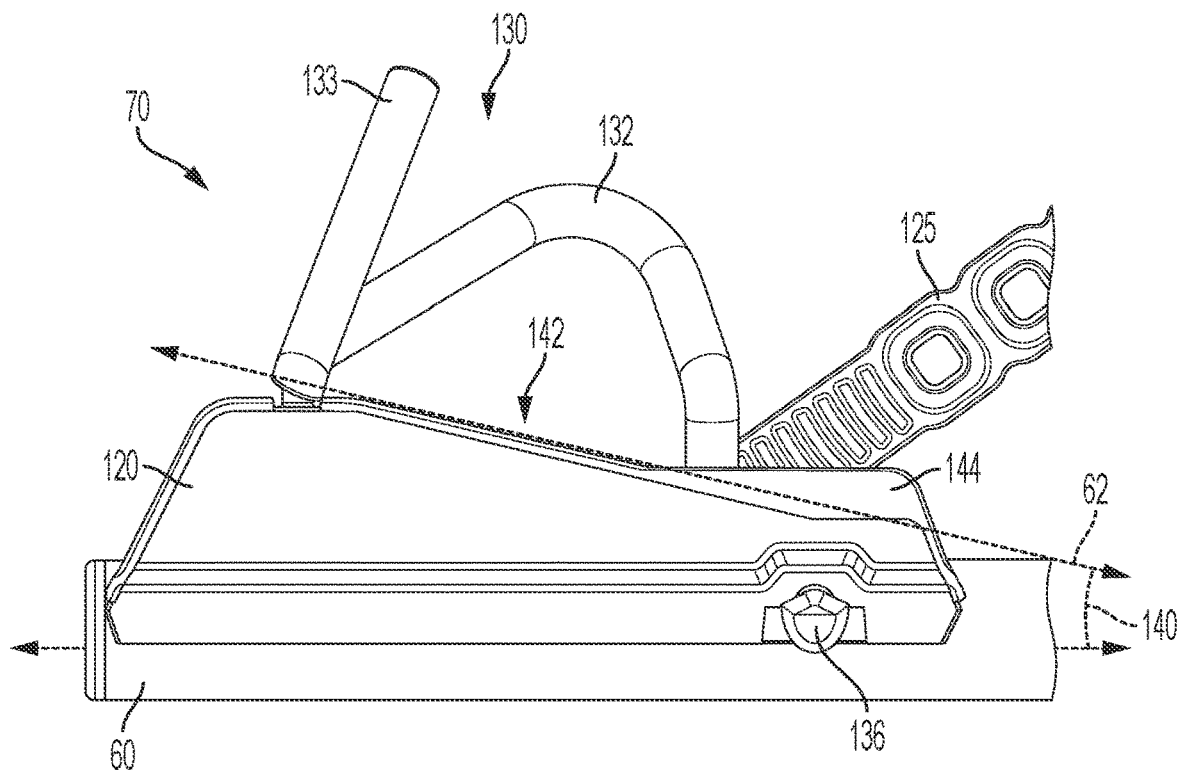
FIG. 3 is a rear view of a gripping station of the bicycle rack of FIG. 1.
Figure 4:
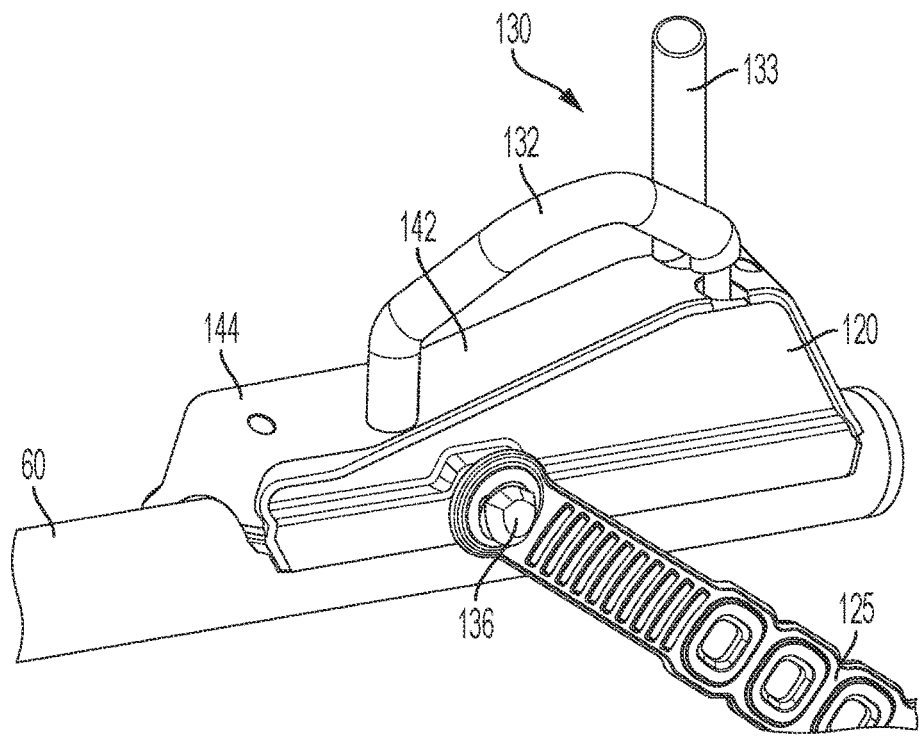
FIG. 4 is an isometric front view of the gripping station of FIG. 3.
Figure 5:
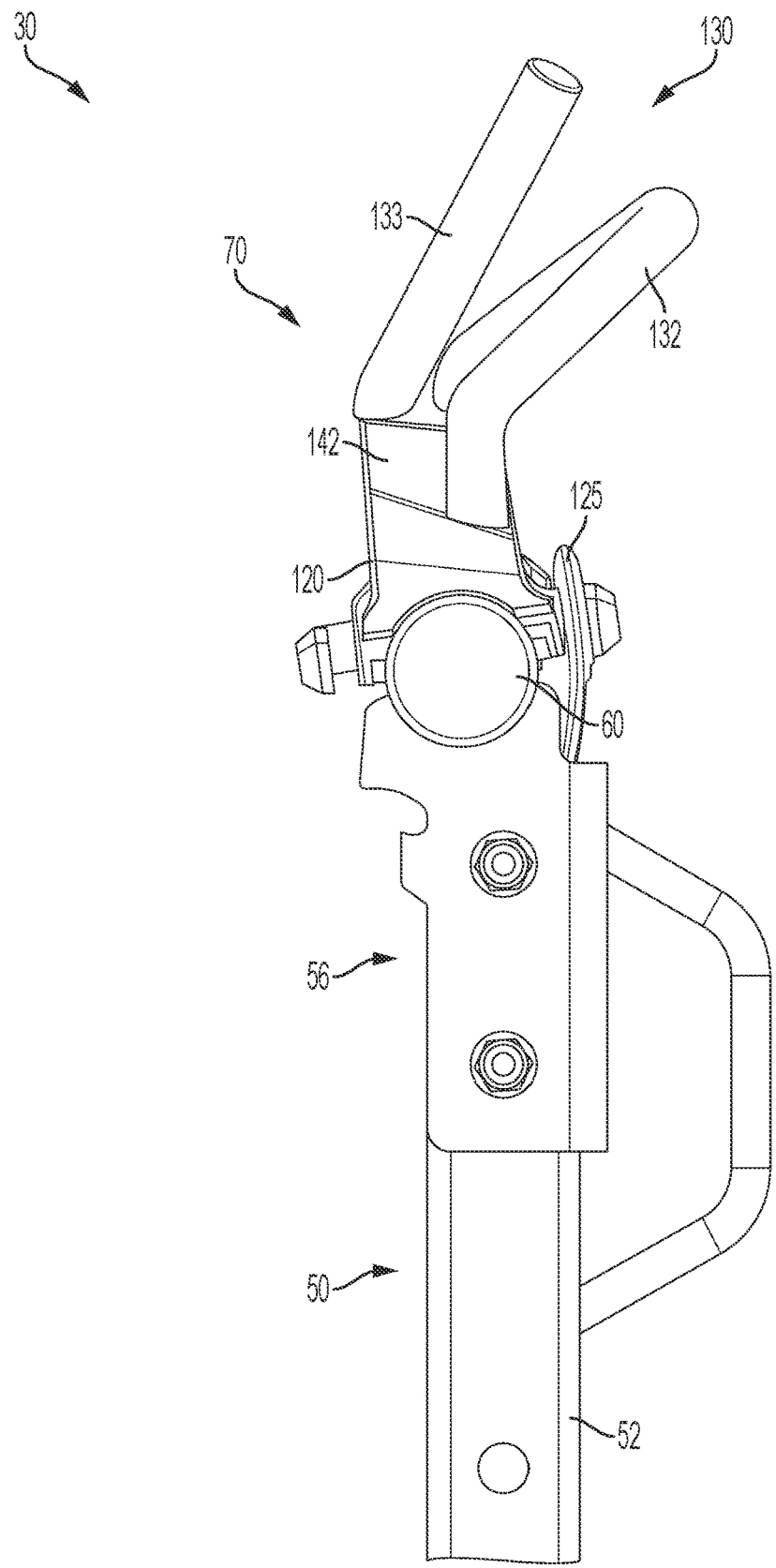
FIG. 5 is a side view of the top beam of the bicycle rack of FIG. 1, including the gripping station of FIG. 3.

FIGS. 3-5 show one of fork crown gripping stations 70. Each gripping station 70 is substantially identical, and the following description may be understood to apply to each of the gripping stations. Gripping station 70 is an illustrative gripping station, and rack 30 may include any effective gripping station and/or combination of gripping stations. Other illustrative gripping stations are described in reference to FIGS. 10-12, below.

Referring again to FIG. 3, fork crown gripping station 70 includes a base 120, a crown strap 125, and a fork crown brace 130. Gripping station 70 is configured to support the fork crown of a bicycle between brace 130 and base 120. When the bicycle is lowered into the gripping station, gravity may cause the fork crown to engage securely with brace 130, and the mass of the bicycle may impart a moment on the fork about the head tube of the bicycle, urging the fork crown to contact base 120. The bicycle fork crown may be secured against base 120 with crown strap 125.

Brace 130 includes an inner post 132 and an outer post 133. Each post includes a rigid core material and a coating of a compressible material such as rubber and/or foam. Such a composition may provide structural strength to brace 130, improve friction and/or grip between a bicycle and the brace, and prevent scratching of the bicycle. In the present example, inner post 132 and outer post 133 share a single metal rod as a core, which is bent to form brace 130. Brace 130 may include any sufficiently strong material and/or combination of materials.

Crown brace 130 is asymmetrically shaped. In the present example, outer post 133 includes a single arm, with a free end spaced from inner post 132. Inner post 132 includes two arms, joined at an elbow to form a v-shape. Together with base 120, inner post 132 forms a generally triangular shape. The two posts extend at different angles relative to base 120, top beam 60, and the mast.

Each of posts 132, 133 extends upward from base 120, proximate a first end of the base. The posts may be described as having a vertical stem. Outer post 133 and the first arm of inner post 133 extend away from each other as each post continues from the corresponding stem. Outer post 133 and the first arm of inner post 133 each form an acute angle with an upper surface 142 of base 120. An acute angle is also formed between the outer post and the first arm of the inner post.

The second arm of inner post 132 extends back toward a second end of base 120. As can be seen more clearly in FIG. 4, the second arm ends with another vertical stem contacting base 120. In some examples, the stem of outer post 133 and/or either or both stems of inner post 132 may be anchored to base 120, may be anchored to top beam 60, and/or may be connected.

Crown brace 130 is configured to receive the fork crown of a bicycle, such that outer post 133 is disposed on a first side of the fork crown and inner post 132 is disposed on a second side of the fork crown, with inner post 132 disposed between the blades of the bicycle fork. Outer post 133 may be described as disposed above the fork crown and inner post 132 may be described as below the fork crown, relative to a reference frame of the bicycle. Brace 130 may be configured to allow a fork crown to be lowered between posts 132 and 133, from above. A fork crown received by brace 130 may be urged by the force of gravity toward the vertex where posts 132 and 133 meet base 120.

In the present example, inner post 132 is configured in a shape that substantially fills the space between the fork blades of a bicycle supported by gripping station 70. The bicycle fork blades are urged by gravitational force onto the v-shaped arms of inner post 132 such that the blades engage inner post 132 securely. Because the width between the arms of inner post 132 varies with height above base 120, it can accommodate bicycles with a range of different fork widths (i.e., different spacing between the fork blades). In some examples, inner post 132 may be configured in a different shape, such as rectangular or elliptic. In some examples, inner post 132 may include a plate, bar and/or planar section extending between the arms of the post, or the arms of the post may be replaced by a planar expanse.

Upper surface 142 of base 120 is shaped as a ramp, sloping down from the first end of the base toward top beam 60. The upper surface forms an oblique rest angle 140 with respect to a longitudinal axis 62 of top beam 60. In the present example, rest angle 140 is acute, between approximately 10 and 30 degrees. Base 120 and upper surface 142 of the base are also sloped in a perpendicular direction and may be described as forming an oblique angle with a vertical axis of mast 50, as shown in FIG. 5. Base 120 may be described as rotated about axis 62 of top mast 60, from a vertical position.

In the present example, upper surface 142 includes a raised area 144. The raised area is configured to contact a supported fork crown proximate one of the fork blades. Raised area 144 is shaped and sloped to provide maximal contact with the fork crown and/or corresponding fork blade.

Figure 6:
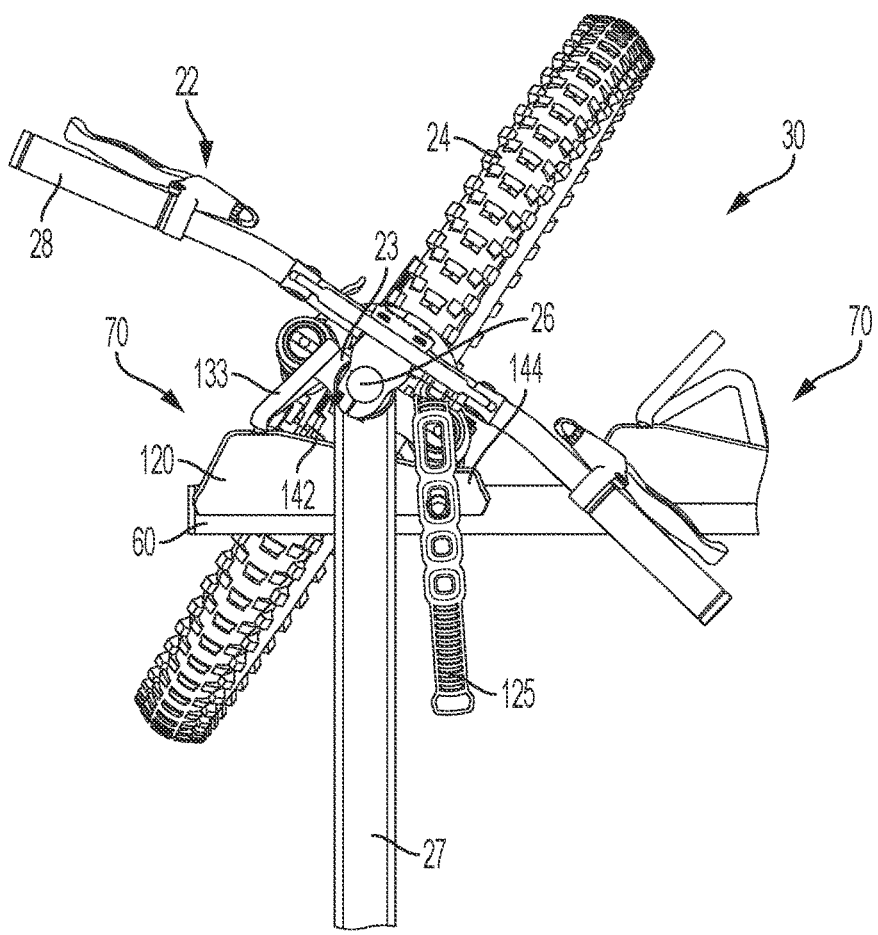
FIG. 6 is a rear view of a bicycle secured by the gripping station of FIG. 3.

FIG. 6 shows a bicycle 22 supported by gripping station 70. Bicycle 22, like a majority of bicycles, includes a steering assembly pivotably attached to a frame assembly. The steering assembly includes a front wheel 24, a fork crown 23, a steerer tube 26, and handlebars 28. The frame assembly includes a frame 27, as well as the seat, gearing, and rear wheel of the bicycle. Front wheel 24 is mounted on the blades of the front fork of the bicycle, which are connected to steerer tube 26 by fork crown 23. The steerer tube extends through the head tube and head set of frame 27 to connect to handlebars 28.

Gripping station 70 is configured to secure the steering assembly off-axis from the frame assembly. In other words, bicycle 22 is supported with handlebars 28 and front wheel 24 inclined at an angle relative to top beam 60 and the rest of the bicycle. Frame 27 pivots on steerer tube 26 and is pulled to a vertical orientation by gravity.

Supporting bicycle 22 with inclined, off-axis handlebars and front wheel may decrease the spacing required between adjacent bicycles. Rest angle 140 (see FIG. 3) and the shape of base 120 may be selected to achieve a desired orientation of handlebars 28 and front wheel 24. Gripping station 70 may be thereby configured to maximize the number of bicycles that can simultaneously be hung on rack system 30, and/or to ensure a desired minimum separation between bicycles. In some examples, vertical rack system 30 includes a plurality of gripping stations 70, and the base 120 of each gripping station 70 does not incline at the same respective angle 140. In some examples, base 120 may be adjustable, such that rest angle 140 is selectable by a user.

Crown strap 125 is configured to secure fork crown 23 in gripping station 70. When bicycle 22 is loaded into the gripping station, the fork crown may be urged into the correct position by gravity and by contact with crown brace 130 and base 120. Once loaded, fork crown 23 and the steering assembly of the bicycle may be secured at the desired inclination by crown strap 125. The crown strap holds fork crown 23 proximate one end of the crown and may also engage the corresponding blade of the fork.

In the present example, crown strap 125 is a flexible length of rubber with multiple holes. As shown in FIG. 4, a hole at a first end of the strap is removably secured to a knob 136 disposed on an inner side of base 120. As shown in FIG. 6, the strap extends up and over fork crown 23, and another hole is secured over a knob 136 disposed on an outer side of base 120. In some examples, crown strap 125 may include a ratcheting strap, a nylon tie, and/or any effective means of holding fork crown 23 against base 120.

Base 120 of gripping station 70 may be attached to top beam 60 by any effective means. The base may be welded, bonded, clamped, and/or fastened to the beam. In the present example, a bottom surface of base 120 is configured in substantially the same shape as an upper portion of the cross-section of top beam 60, such that base 120 sits snugly on top beam 60.

In some examples, base 120 may be adjustable along axis 62 of top beam 60. For instance, the bottom surface of base 120 may include a longitudinal slot, and top beam 60 may include one or more pins configured to be received by the slot of the base. When the pin is received in the slot, base 120 may be longitudinally displaceable along top beam 60, but may be prevented from rotating angularly about axis 62. A user may be thereby afforded some flexibility in the placement of bicycles along top beam 60, but prevented from accidentally moving base 120 into an angular position that is suboptimal for supporting a bicycle. A user may adjust the longitudinal position of a gripping station 70 in order to reduce the likelihood of contact between adjacent bicycles hung on rack 30.

Figure 7:
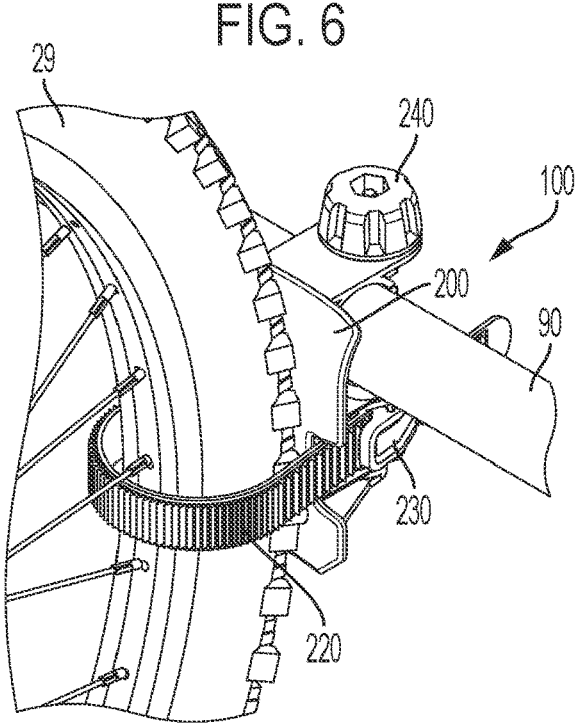
FIG. 7 is an isometric view of a bicycle secured to a rear wheel binding device of the bicycle rack of FIG. 1.

FIG. 7 depicts one of rear wheel binding devices 100, securing a rear wheel 29 of bicycle 22. Each binding device 100 is substantially identical, and the following description may be understood to apply to each of the binding devices. Binding device 100 is an illustrative binding device, and rack 30 may include any effective binding device and/or combination of binding devices.

Binding device 100 includes a wheel cradle 200, and a wheel strap 220. Wheel cradle 200 is configured to contact the tire of rear wheel 29, and wheel strap 220 is configured to secure the wheel against cradle. Wheel strap 220 extends from a first side of wheel cradle 200, over the rim of rear wheel 29, between the spokes of the wheel, and to an opposing second side of the wheel cradle. In the depicted example, wheel strap 220 is a ratchet strap securable by a ratcheting buckle 230. In some examples, wheel strap 220 may match crown strap 125, may include one or more lengths of nylon webbing, and/or may include any effective means of securing rear wheel 29 against wheel cradle 200. In some examples, binding device 100 may include attachment points for a strap or other securing mechanism supplied by a user.

Binding device 100 is attached to bottom beam 90 with an adjustable fastener 240, which facilitates longitudinal and/or angular displacement of binding device 100 along bottom beam 90. A user can displace binding device 100 longitudinally such that it corresponds to the position of a gripping station 70. Adjusting the longitudinal or angular position of binding device 100 about bottom beam 90 may accommodate bicycles with different types of wheelbase. Adjustable fastener 240 is manually operable (i.e., without tools).

Bicycle 22 may be fully immobilized by fork crown gripping station 70 and rear wheel binding device 100. As discussed in reference to FIG. 6, gripping station 70 may secure the steering assembly of the bicycle by engaging fork crown 23 on either side of steerer tube 26. The frame assembly of the bicycle may be vertically restrained by crown strap 125 of the gripping station. The frame assembly may further be restrained from lateral, pivoting motion by securing rear wheel 29 with binding device 100. Bicycle 22 may be thereby prevented from either being bounced, joggled, or otherwise urged off of rack 30 or contacting an adjacent bicycle during transport.

Figure 8:
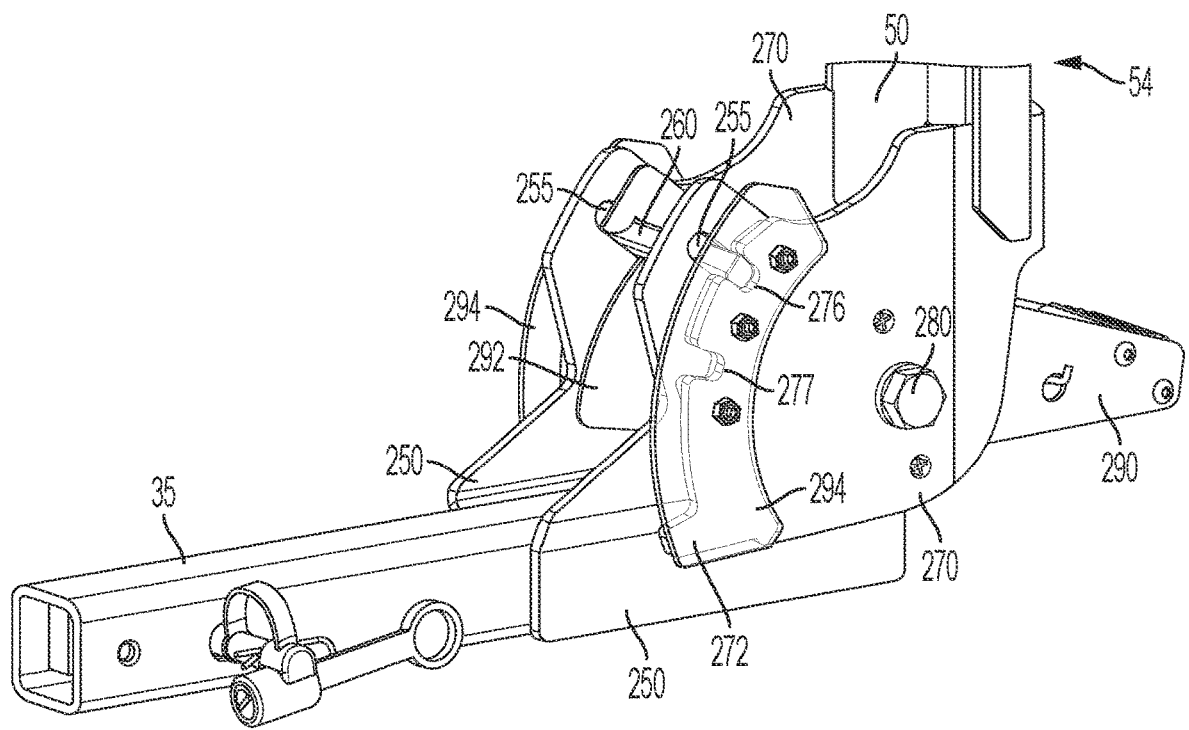
FIG. 8 is an isometric view of the mast tilting assembly of the bicycle rack of FIG. 1, in a latched position.
Figure 9:
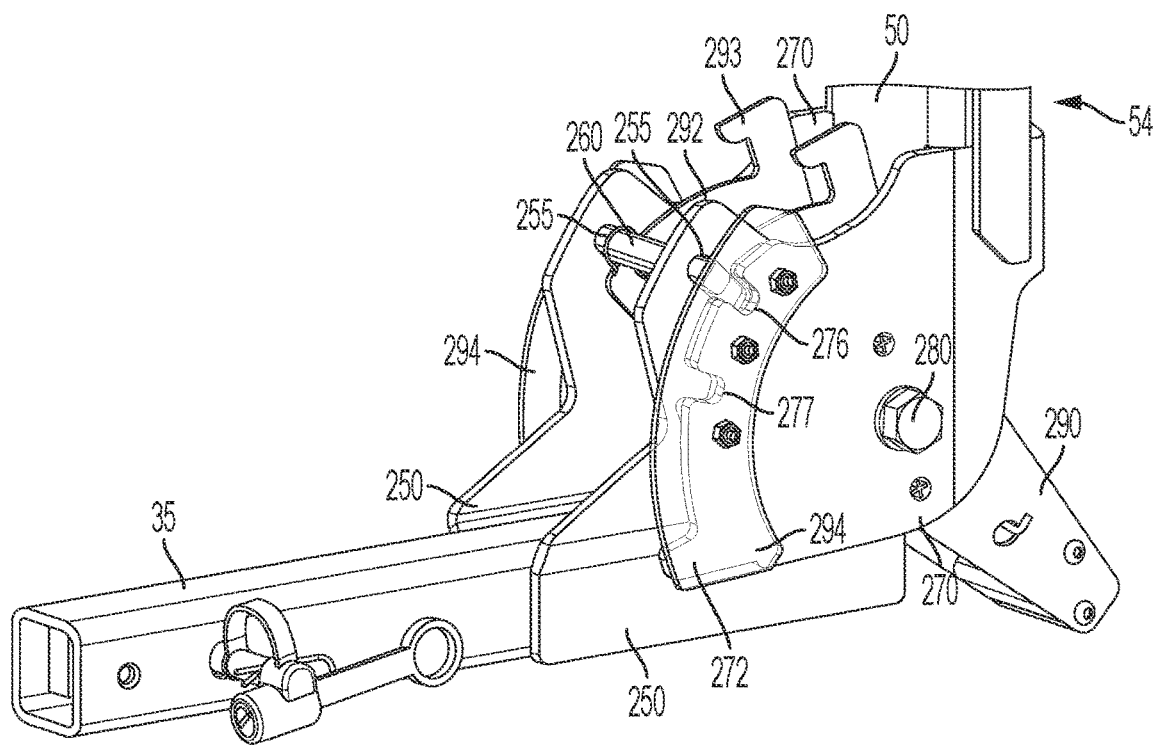
FIG. 9 is an isometric view of the mast tilting assembly of FIG. 8, in an unlatched position.

FIGS. 8 and 9 depict mast tilting assembly 40 of rack 30 in two positions. FIG. 8 shows the assembly in a latched position, and FIG. 9 shows the assembly in an unlatched position. In the latched position, mast 50 is secured at a fixed angle relative to hitch bar 35. In the unlatched position, mast 50 can be pivoted relative to hitch bar 35 by a user, within a limited angular range.

Mast tilting assembly 40 includes a pair of fixed plates 250 mounted to hitch bar 35. Fixed plates 250 each include a slot 255. The two slots are aligned such that the slots together retain a latch bar 260. Mast tilting assembly 40 further includes a pair of rotatable plates 270. Rotatable plates 270 are fixed rigidly to mast 50 and are rotatably coupled to fixed plates 250. A bolt 280 extends through rotatable plates 270 and fixed plates 250. Rotation of rotatable plates 270 about bolt 280 pivots mast 50 relative to hitch bar 35, which may facilitate transition of vertical rack system 30 between the bicycle-transport, stowed, and trunk-access positions.

Rotatable plates 270 each include two notches, forming a first pair of notches 276 and a second pair of notches 277. Each pair of notches is configured to align with slots 255 when mast 50 is pivoted into a selected angular position. When one of the pairs of notches on rotatable plates 270 is aligned with slots 255 of fixed plates 250, latch bar 260 can slide in slots 255 to be received in the aligned pair of notches. Latch bar 260 may thereby hold rotatable plates 270 fixed relative to fixed plates 250 and prevent pivoting of mast 50, as shown in FIG. 8.

When latch bar 260 is received in a pair of notches, assembly 40 may be described as latched. When latch bar 260 is not received in a pair of notches, assembly 40 may be described as unlatched. Latch bar 260 may be spring-biased toward bolt 280, such that the latch bar 260 automatically engages a pair of notches when the notches are aligned with slots 255. Assembly 40 may thereby automatically latch when mast 50 is pivoted to one of the selected angular positions.

First pair of notches 276 aligns with slots 255 when rack 30 is in the stowed position, and second pair of notches 277 aligns with slots 255 when rack 30 is in the bicycle-transport position. Mast tilting assembly may be thereby latched in each of the stowed and transport positions. In some examples, rotatable plates 270 may include other pairs of notches, which may align with slots 255 when rack 30 is in other positions.

In the present example, rotatable plates 270 do not include a pair of notches corresponding to the trunk-access position, and mast tilting assembly 40 does not latch in the trunk-access position. This may allow a user some flexibility in adjusting mast 50 in the trunk-access position and may reduce the likelihood that vertical rack system 30 will be unintentionally left in the trunk-access position. Rotatable plates 270 each further include a rotational stop 272. The rotational stops may limit the angular range of mast 50 in the trunk-access position, by engaging latch bar 260.

Each rotatable plate 270 includes a guard plate 294. In FIGS. 8 and 9, one of the guard plates is shown as transparent. Guard plates 294 are mounted on exterior surface of rotatable plates 270, obscuring notches 276, 277. The guard plates may shield the notches and latch bar 260 from accidental interference by a user and/or intrusion of road dirt or other debris.

Mast tilting assembly 40 includes a pedal 290, operable to transition the assembly between the latched and unlatched positions. Pedal 290 includes two pedal plates 292 joined at a distal end. The pedal is pivotable about bolt 280 and is configured to pivot in response to pressure applied at the distal end by a user. As shown in FIG. 1, assembly 40 is disposed at a height similar to the hitch receiver of vehicle 20. Pedal 290 may be operated by a user pressing down on pedal 290 with their foot, which may be convenient for the user, due to the location. Operation of pedal 290 by foot may also allow a user to control pivoting of mast 50 by grasping distal portion 56 of the mast.

Referring again to FIG. 8, pedal plates 292 each include a hook member 293. The hook members are configured to engage latch bar 260, when assembly 40 is latched and pedal 290 is not depressed, as shown. Hook members 293 may prevent latch bar 260 from sliding in slots 255 and thereby prevent assembly 40 from unlatching. Pedal 290 may be spring-biased to return to the depicted undepressed position unless actively depressed by a user.

In FIG. 9, pedal 290 is shown pivoted about bolt 280 to a depressed position. Each pedal plate 292 includes a curved edge not symmetrical about bolt 280. As pedal 290 pivots about the bolt, the edges of pedal plates 292 lift locking bar 260 away from rotatable plates 270, and out of any engaged pair of notches. Pedal 290 thereby transitions assembly 40 from latched to unlatched. Pedal 290 may be configured to support mast 50 against any gravitational moment. Mast tilting assembly 40 may include a spring bias and/or other means to slowing and/or prevent pivoting of mast 50 due to gravity.

To operate mast tilting assembly 40, a user may hold pedal 290 in the depressed position with one foot. Latch bar 260 may be thereby lifted, unlatching assembly 40. Grasping mast 50, the user may pivot the mast to approximately desired position. The user may then release pedal 290 to return to the undepressed position. In the stowed and transport positions, latch bar 260 may be received into first pair of notches 276 or second pair of notches 277, respectively. In the trunk-access position, latch bar 260 may rest against rotatable plates 270 and mast 50 may remain pivotable. Mast 50 may be supported in the trunk-access position by contact between rotational stops 272 and latch bar 260.

Mast tilting assembly 40 is an illustrative mast tilting mechanism, and rack 30 may include any effective connection between hitch bar 35 and mast 50. For example, mast 50 may be permanently fixed to hitch bar 35, and rack 30 may be removed from the vehicle when not in use. For another example, rotatable plates 270 may be secured relative to fixed plates 250 by a clevis pin inserted through aligned apertures. For another example, pedal plates 292 may be replaced by actuator plates rotated by a cable extending from an actuator disposed proximate the distal portion of mast 50.

Figure 10:
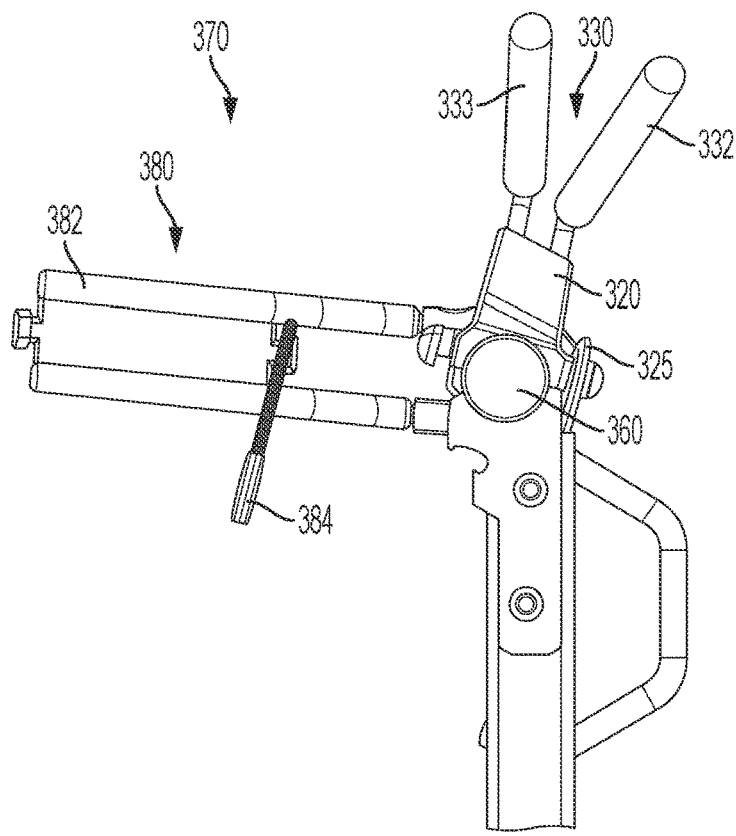
FIG. 10 is a side view of a top beam of another illustrative vertical bicycle rack.
Figure 11:
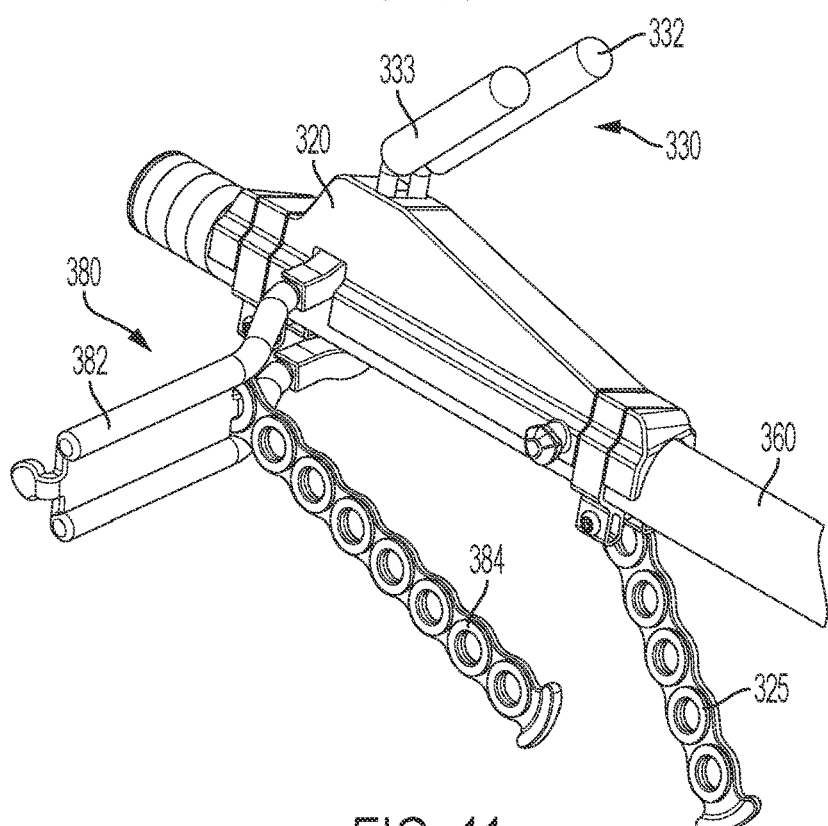
FIG. 11 is an isometric view of a gripping station of the bicycle rack of FIG. 10.
Figure 12:
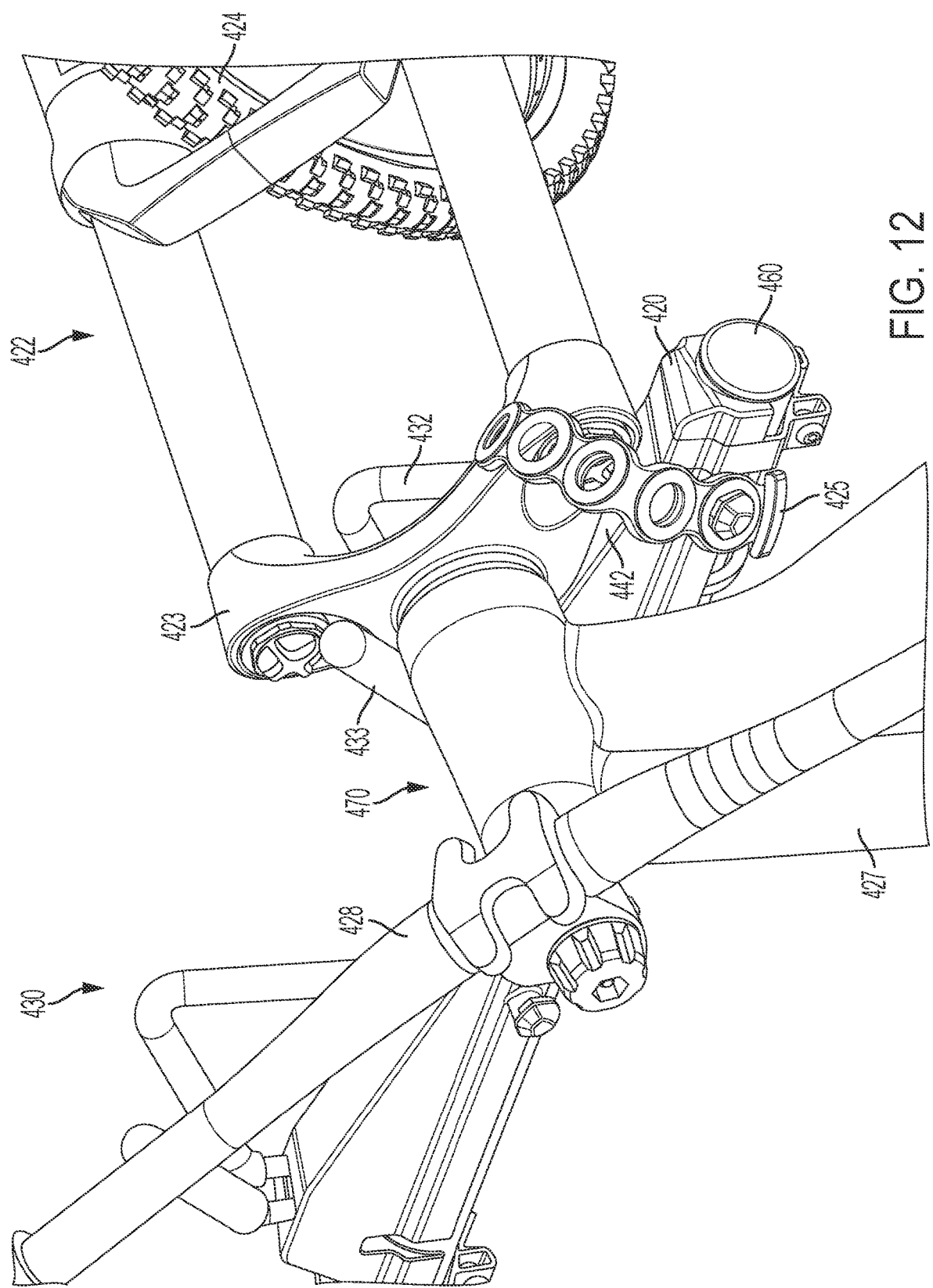
FIG. 12 is an isometric view of a bicycle secured to another illustrative vertical bicycle rack.

FIGS. 10-12 depict another illustrative fork crown gripping station 370, which may be used with rack 30 and/or any rack according to aspects of the present disclosure. Gripping station 370 includes a base 320, a crown strap 325, and a fork crown brace 330. The brace includes an inner post 332 and an outer post 333 of matching shape and length. Posts 332, 333 are configured to extend upward from base 320, such that they form an acute angle with top beam 60 and with each other. Posts 332 and 333 protrude from base 320 at substantially the same location, forming a vertex proximate a top beam 360 and diverging away from top beam 360.

Gripping station 370 further includes a frame support 380 configured to provide additional support and/or stabilization to a bicycle. Frame support 380 includes support bar 382 and frame strap 384. Support bar 382 is configured to contact the frame of a bicycle hung from the gripping station, for example the support bar may contact the top tube of the bicycle. Frame strap 384 is configured to secure the frame to the support bar, such that movement of the bicycle with respect to the rack is restricted.

Support bar 382 and/or frame support strap 384 may be coated with or formed from rubber or another material suitable to prevent scratching of the bicycle frame. In some examples, support bar 382 may be pivotable about top beam 60 or otherwise configured to be movable away from the bicycle. Moving support bar 382 away from the bicycle prior to mounting the bicycle on rack system 30 may reduce the likelihood of damage to the bicycle during mounting, prevent inconveniences such as the brakes lines of the bicycle catching on support bar 382, and/or allow the user to avoid using support bar 382 if desired.

In the depicted example, base 320 includes an aperture to receive frame support 380, fixing the position of the frame support along top beam 60 while allowing pivoting of the frame support about the top beam. In some examples, the aperture of base 320 may be configured to maintain the position of frame support 380 with respect to gripping station 370. In some examples, frame support assembly 380 may be separately, slidably attached to top beam 60.

FIG. 12 depicts another bicycle 422 supported by another illustrative fork crown gripping station 470, which may be used with rack 30 and/or any rack according to aspects of the present disclosure. Gripping station 470 includes a base 420, a crown strap 425, and a fork crown brace 430. An inner post 432 of crown brace 430 is configured in a triangular or V-shape, and an outer post 433 of brace 430 is an elongate and substantially straight projection.

Bicycle 422 hangs from gripping station 70 with a fork crown 423 of the bicycle between inner post 432 and outer post 433. Inner post 432 is disposed between the fork blades of the bicycle. Inner post 432 is configured to contact both fork blades of the bicycle and to contact fork crown 423 at two contact points. Such contact may prevent the fork crown pivoting about inner post 432. Contact between inner post 432 and the bicycle may help to stabilize the bicycle so that it may be transported securely.

Gripping stations such as gripping station 470, in which inner post 432 substantially fills the space between bicycle fork blades, may support a bicycle with enough security and stability that a frame support such as frame support 380, described above, can be omitted. A rack without frame supports may be preferable for carbon fiber bicycles, which can sustain damage or loss of warranty when mounted on a rack using frame support. Such racks may also be preferable for hanging bicycles with step-through frames, which often require an adapter bar for attachment to a frame-supporting rack.

Fork crown 423 rests on base 420. The angle of upper surface 442 of base 420 along top beam 460 influences the angle of fork crown 423 relative to a frame 427 of bicycle 422, and therefore also the angle of handlebars 428 and a front wheel 424. The angle may be selected to minimize spacing between adjacent bicycles.

Base 420 is also rotated slightly around top beam 460, from a top position, and upper surface 442 is sloped in a direction perpendicular to the extent of the top beam. The rotation and slope of the upper surface influence the angle of frame 427 relative to vertical, and therefore also a spacing between the frame and top beam 460. The slope may be selected to maximize clearance between the bicycle frame and the top beam.

Base 420 may be shaped and oriented to provide desired positioning of a supported bicycle. However, bicycles vary widely in size, shape, and frame and/or fork geometry.

Bicycles of varying design may be supported differently by gripping station 470. Accordingly, in some examples, base 420 may be shaped and oriented to provide acceptable positioning for a selected range and/or a widest possible range of bicycle configurations.

Fork crown strap 425 is configured to secure the fork crown to base 420 for additional security and stability. Similarly to crown strap 125, described above, crown strap 425 is connect at a first end to base 420. When securing bicycle 422, as shown in FIG. 10, the crown strap passes between the fork blades of bicycle 422 and over fork crown 423. A second end of crown strap 425 is removably attached to base 420. In the present example, each end of the strap attached to base 420 at a matching point along top beam 460.

Illustrative Combinations and Additional Examples

This section describes additional aspects and features of illustrative bicycle racks, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A bike rack system, comprising:
a hitch connector,
a mast,
a horizontal top beam connected to an upper portion of the mast,
one or more fork support assemblies connected to the horizontal top beam, wherein each of the one or more fork support assemblies includes a fork crown rod, the fork crown rod including two posts, and a fork crown rest, the fork crown rest including a platform configured to support a fork crown of a bicycle,
a horizontal bottom beam connected to a lower portion of the mast, and
one or more rear wheel support assemblies connected to the horizontal bottom beam, wherein each of the one or more rear wheel support assemblies includes a rear wheel support configured to contact a rear wheel of the bicycle and a wheel strap configured to secure the wheel to the rear wheel support.

A1. The bike rack system of A, wherein the mast includes:
an outer mast segment and one or more inner mast segments, wherein the outer mast segment and the one or more inner mast segments are disposed in a telescoping configuration, such that the mast is transitionable between an extended configuration and a collapsed configuration, and
a locking mechanism operable to selectively prevent the mast from telescoping.

A2. The bike rack system of A or A1, wherein the mast is connected to the horizontal bottom beam by a mast tilting assembly, and the mast tilting assembly is configured to enable the mast to pivot.

A3. The bike rack system of A2, wherein the mast tilting assembly is configured to enable the mast to pivot away from a vehicle to which the bike rack system is connected.

A4. The bike rack system of A2 or A3, wherein the mast tilting assembly includes a pedal, and wherein the mast is enabled to pivot by operation of the pedal.

A5. The bike rack system of any of A-A4, wherein the fork support assemblies further include a fork strap configured to selectively secure the fork crown of the bicycle to the fork crown rest.

A6. The bike rack system of any of A-A5, wherein one of the two posts of the fork crown rod is a large post configured to substantially fill a space between bicycle fork blades.

A7. The bike rack system of A6, wherein the large post is configured in a triangular shape.

A8. The bike rack system of any of A-A7, wherein the fork support assemblies are slidably attached to the horizontal top beam, and the rear wheel support assemblies are slidably attached to the horizontal bottom beam.

A9. The bike rack system of A8, wherein the fork support assemblies are configured not to be rotatable about the horizontal top beam.

A10. The bike rack system of any of A-A9, further including a frame support bar connected to the horizontal top beam and a frame strap configured to secure a bicycle frame to the frame support bar.

A11. The bike rack system of any of A-A10, wherein the wheel strap is a ratcheting strap, and each of the rear wheel support assemblies further includes a ratcheting buckle capable of receiving the ratcheting strap.

B. A bicycle rack, comprising:
a hitch mount device,
a mast structure having a proximal portion connected to the hitch mount device, and a distal portion extending upward from the proximal portion,
an upper beam structure connected horizontally to the distal portion of the mast structure, and
a first fork crown gripping station mounted on the upper beam structure, wherein the first fork crown gripping station includes a first post structure and a strap configured to cooperatively bind a bicycle front fork crown to the first fork crown gripping station.

B1. The bicycle rack of B, wherein the first post structure and the strap being configured to engage the front fork crown on opposite sides of the steerer tube.

B2. The bicycle rack of B or B1, wherein the first fork crown gripping station includes a second post structure configured to project under a bicycle front fork crown.

B3. The bicycle rack of B2, wherein the second post has an inverted V-shape.

B4. The bicycle rack of any of B-B3, wherein the first fork crown gripping station includes a base having a laterally inclined surface configured to support a bicycle front fork crown.

B5. The bicycle rack of B4, wherein the first post structure and the strap are connected to the base.

B6. The bicycle rack of any of B-B5, wherein the first post is configured to project over a top side of a bicycle front fork crown.

B7. The bicycle rack of any of B-B6, further comprising:
a lower beam structure connected horizontally to the proximal portion of the mast structure, and
a wheel binding device mounted on the lower beam structure, configured to secure a rear wheel of a bicycle while the front fork crown is supported by the first fork crown gripping station.

B8. The bicycle rack of any of B-B7, further comprising:
a second fork crown gripping station mounted on the upper beam structure, configured to support a first bicycle adjacent to a second bicycle supported by the first fork crown gripping station.

C. A bicycle rack, comprising:
a hitch mount device,
a mast structure having a proximal portion pivotally connected to the hitch mount device, and a distal portion extending upward from the proximal portion,
an upper beam structure connected horizontally to the distal portion of the mast structure, and
a first fork crown gripping station mounted on the upper beam structure.

C1. The bicycle rack of C, wherein the first fork crown gripping station includes a first post structure configured to project over a top side of a bicycle front fork crown, and a strap configured to bind the bicycle front fork crown to the first fork crown gripping station.

C2. The bicycle rack of C1, wherein the first post structure and the strap are configured to engage the front fork crown on opposite sides of the steerer tube.

C3. The bicycle rack of C1 or C2, wherein first fork crown gripping station includes a second post structure configured to project under a bicycle front fork crown.

C4. The bicycle rack of any of C1-C3, wherein second post has an inverted V-shape.

C5. The bicycle rack of any of C-C4, further comprising:
lower beam structure connected horizontally to the proximal portion of the mast structure, and
a wheel binding device mounted on the lower beam structure, configured to secure a rear wheel of a bicycle while the front fork crown is supported by the first fork crown gripping station.

C6. The bicycle rack of any of C-C5, further comprising:
a second fork crown gripping station mounted on the upper beam structure, configured to support a first bicycle adjacent to a second bicycle supported by the first fork crown gripping station.

C7. The bicycle rack of any of C-C6, wherein the first fork crown gripping station includes a base having a laterally inclined surface configured to support a bicycle front fork crown.

D. A bicycle rack, comprising:
a hitch mount device,
a mast structure having a proximal portion connected to the hitch mount device, and a distal portion extending upward from the proximal portion,
an upper beam structure connected horizontally to the distal portion of the mast structure, and
a first fork crown gripping station mounted on the upper beam structure, wherein the first fork crown gripping station includes a base mounted on the upper beam structure, the base having a crown support surface forming an oblique angle with a long axis of the upper beam structure.

D1. The bicycle rack of D, wherein the first fork crown gripping station includes a first post structure configured to project over a top side of a bicycle front fork crown, and a strap configured to bind the bicycle front fork crown to the first fork crown gripping station.

D2. The bicycle rack of D or D1, further comprising:
a lower beam structure connected horizontally to the proximal portion of the mast structure, and
a wheel binding device mounted on the lower beam structure, configured to secure a rear wheel of a bicycle while the front fork crown is supported by the first fork crown gripping station.

D3. The bicycle rack of any of D-D2, further comprising:
a second fork crown gripping station mounted on the upper beam structure, configured to support a first bicycle adjacent to a second bicycle supported by the first fork crown gripping station.

Advantages, Features, and Benefits

The different examples of the bicycle rack described herein provide numerous advantages over known solutions for transporting bicycles with a vehicle. For example, illustrative examples described herein allow multiple bicycles to be securely transported in a vertical and compact formation.

Additionally, and among other benefits, illustrative examples described herein prevent supported bicycles becoming dislodged from the rack due to unpredictable movement resulting from road conditions and vehicle motion.

Additionally, and among other benefits, illustrative examples described herein allow a bicycle to be secured in a vertical orientation without direct contact to the frame of the bicycle.

Additionally, and among other benefits, illustrative examples described herein can pivot and/or telescope, providing versatility to accommodate a wide range of bicycle types, sizes, and combination, as well as different automobile designs.

Additionally, and among other benefits, illustrative examples described herein minimize spacing between adjacent bicycles by securing bicycles with an inclined front wheel. Such minimal spacing may allow more bicycles to be safely transported than can be accommodated by typical hitch-mounted bicycle racks.

The illustrative examples described herein are particularly useful for transporting mountain bikes and/or front suspension bicycles. However, not all examples described herein provide the same advantages or the same degree of advantage.

Conclusion

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A bicycle rack, comprising:
   a hitch mount device,
   a mast structure connected to the hitch mount device by a mast tilting assembly, the mast tilting assembly including:
      a bolt,
      an manual actuator fixed to an actuator plate, the actuator plate being pivotable about the bolt and having a cam surface,
      a latch bar moveable by the cam surface of the actuator plate from a latched position to an unlatched position,
      a first plate fixed to the hitch mount device and having a slot configured to receive the latch bar in the latched position, and
      a second plate fixed to the mast structure, pivotable about the bolt when the latch bar is in the unlatched position, and having a first notch configured to receive the latch bar in the latched position.

2. The bicycle rack of claim 1, wherein the actuator plate includes a hook member configured to receive the latch bar and retain the latch bar in the latched position.

3. The bicycle rack of claim 1, wherein the cam surface of the actuator plate is a curved surface asymmetrical about the bolt.

4. The bicycle rack of claim 1, wherein the manual actuator is a pedal.

5. The bicycle rack of claim 1, wherein the second plate is rotatably coupled to the first plate.

6. The bicycle rack of claim 1, wherein the second plate includes a second notch configured to receive the latch bar in the latched position.

7. The bicycle rack of claim 6, wherein the mast has a stowed position in which the first notch of the second plate is aligned with the slot of the first plate, and a bicycle transport position in which the second notch of the second plate is aligned with the slot of the first plate.

8. The bicycle rack of claim 1, wherein the latch bar is spring biased to return to the latched position.

9. The bicycle rack of claim 1, wherein the second plate includes a rotational stop.

10. The bicycle rack of claim 9, wherein the mast has a trunk-access position in which the latch bar contacts the rotational stop.

11. The bicycle rack of claim 1, wherein:
    the actuator plate is one of a pair of actuator plates each fixed to the manual actuator, pivotable about the bolt, and having a cam surface,
    the first plate is one of a pair of first plates each fixed to the hitch mount device and having a slot configured to receive the latch bar in the latched position, and
    the second plate is one of a pair of second plates each fixed to the mast structure, configured to pivot about the bolt, and having a first notch configured to receive the latch bar in the latched position.

12. The bicycle rack of claim 11, wherein the pair of actuator plates is between the pair of first plates, and the pair of first plates are between the pair of second plates.

13. A bicycle rack tilt assembly, comprising:
    a bolt,
    a manual actuator fixed to a pair of actuator plates, each actuator plate being pivotable about the bolt and having a cam surface,
    a latch bar moveable by the cam surface of the actuator plate from a latched position to an unlatched position,
    a pair of fixed plates, each fixed plate having a slot configured to receive the latch bar in the latched position, and
    a pair of rotatable plates, each rotatable plate being rotatably coupled to the fixed plate, pivotable about the bolt when the latch bar is in the unlatched position, and having a first notch configured to receive the latch bar in the latched position.

14. The bicycle rack tilt assembly of claim 13, wherein each actuator plate includes a hook member configured to receive the latch bar and retain the latch bar in the latched position.

15. The bicycle rack tilt assembly of claim 13, wherein the cam surface of each actuator plate is a curved surface asymmetrical about the bolt.

16. The bicycle rack tilt assembly of claim 13, wherein the latch bar is spring biased to return to the latched position.

17. The bicycle rack tilt assembly of claim 13, wherein each rotatable plate includes a second notch configured to receive the latch bar in the latched position.

18. The bicycle rack tilt assembly of claim 13, wherein each rotatable plate includes a rotational stop configured to engage the latch bar.

19. The bicycle rack tilt assembly of claim 13, wherein the pair of actuator plates is between the pair of fixed plates, and the pair of fixed plates are between the pair of rotatable plates.

20. A bicycle rack, comprising:
    a hitch mount device,
    a mast structure connected to the hitch mount device by a mast tilting assembly, the mast tilting assembly including:
       a bolt,
       an manual actuator fixed to a pair of actuator plates, each actuator plate being pivotable about the bolt and having a cam surface and a hook member,
       a latch bar spring biased to return to a latched position, wherein the latch bar is moveable by the cam surface of the actuator plate from the latched position to an unlatched position, and the hook member of each actuator plate is configured to retain the latch bar in the latched position,
    a crossbeam fixed to the mast structure, and
    a bicycle securing element mounted on the crossbeam.

* * * * *